United States Patent
Kiepe et al.

(10) Patent No.: US 11,048,940 B2
(45) Date of Patent: Jun. 29, 2021

(54) RECOGNITION OF WEED IN A NATURAL ENVIRONMENT

(71) Applicant: BASF SE, Ludwigshafen am Rhein (DE)

(72) Inventors: Bjoern Kiepe, Mühlhausen (DE); Thomas Schilling, Bornheim (DE); Franco Fois, Monheim (DE); Daniel Rechsteiner, Cologne (DE); Sebastian Hellweg, Leverkusen (DE); Alexandra Gladbach, Leverkusen (DE); Birgit Stepponat, Langenfeld (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 233 days.

(21) Appl. No.: 16/300,193

(22) PCT Filed: May 5, 2017

(86) PCT No.: PCT/EP2017/060750
§ 371 (c)(1),
(2) Date: Nov. 9, 2018

(87) PCT Pub. No.: WO2017/194398
PCT Pub. Date: Nov. 16, 2017

(65) Prior Publication Data
US 2019/0220666 A1    Jul. 18, 2019

(30) Foreign Application Priority Data
May 12, 2016  (EP) ..................... 16169416

(51) Int. Cl.
*G06K 9/00*    (2006.01)
*G06K 9/46*    (2006.01)
(Continued)

(52) U.S. Cl.
CPC ....... *G06K 9/00671* (2013.01); *A01M 21/043* (2013.01); *A01M 99/00* (2013.01);
(Continued)

(58) Field of Classification Search
CPC ............. G06T 11/001; G06K 2209/17; G06K 9/00657; G06K 2209/27; G06K 9/00671;
(Continued)

(56) References Cited

U.S. PATENT DOCUMENTS 5,253,302 A * 10/1993 Massen ............... G06T 7/0006
382/110
9,468,152 B1 * 10/2016 Jens .................... G06K 9/00657
(Continued)

FOREIGN PATENT DOCUMENTS

CN         203149656 U        8/2013

OTHER PUBLICATIONS

Rumpf Till, Christoph Römer, Martin Weis, Markus Sökefeld ; "Sequential support vector machine classification for small-grain weed species discrimination with special regard to Cirsium arvense and Galium aparine"; Computers and electronics in agriculture 80, (2012): 89-96.*

(Continued)

*Primary Examiner* — Shaghayegh Azima
(74) *Attorney, Agent, or Firm* — Lowenstein Sandler LLP (57) ABSTRACT

A method (100) for recognizing weed in a natural environment may be provided. A digital image of weed in an early development stage is captured (102) among cultivated crop. Areas with a predefined color and texture specification are contoured (104) defining a boundary contour. The weed is displayed (106) together with a frame and a quality indicator. Moreover, the digital image is stored (110) only if a predefined quality criterion is met. Then, unnecessary color information may be reset (112), the digital image is sent (Continued)

(116) for a further examination, and a weed name of the weed of the captured image and a related probability value indicative of a probability of a match between the weed name and the weed of the captured digital image together image is received (118).

18 Claims, 6 Drawing Sheets

(51) Int. Cl.
- *G06K 9/62* (2006.01)
- *A01M 21/04* (2006.01)
- *G06K 9/03* (2006.01)
- *A01M 99/00* (2006.01)
- *G06T 11/00* (2006.01)

(52) U.S. Cl.
CPC .......... *G06K 9/036* (2013.01); *G06K 9/4642* (2013.01); *G06K 9/4652* (2013.01); *G06K 9/627* (2013.01); *G06T 11/001* (2013.01); *G06K 2209/27* (2013.01)

(58) Field of Classification Search
CPC .... G06K 9/036; G06K 9/4642; G06K 9/4652; A01M 21/043
See application file for complete search history.

(56) References Cited

U.S. PATENT DOCUMENTS

| | | | |
|---|---|---|---|
| 2012/0039531 A1* | 2/2012 | Hsieh | G06T 5/50 382/167 |
| 2013/0235183 A1* | 9/2013 | Redden | A01G 7/00 348/89 |
| 2015/0010239 A1* | 1/2015 | He | G06K 9/00664 382/203 |
| 2015/0187109 A1* | 7/2015 | Mentzer | G06T 11/00 345/632 |
| 2015/0245565 A1* | 9/2015 | Pilgrim | A01C 21/002 280/79.2 |
| 2016/0125222 A1* | 5/2016 | Shamir | G06K 9/00657 382/110 |
| 2016/0283791 A1* | 9/2016 | Ogura | G06Q 30/00 |

OTHER PUBLICATIONS

Hanno Scharr, Massimo Minervini, Andrew P. French, Christian Klukas, David M. Kramer, Xiaoming Liu, Imanol Luengo, Jean-Michel Pape, Gerrit Polder, Danijela Vukadinovic, Xi Yin.;"Leaf segmentation in plant phenotyping: a collation study"; Machine vision and applications; (May 2016).*

Weis Martin; "An image analysis and classification system for automatic weed species identification in different crops for precision weed management", 2010.*

Till Rumpf, Christoph Romer, Martin Weis, Markus Sokefeld, Roland Gerhards, Lutz Pliimer; "Sequential support vector machine classification for small-grain weed species discrimination with special regard to Cirsium arvense and Galium aparine", 2011, Elsevier.*

Valliammal, Geethalakshmi; "Hybrid Image Segmentation Algorithm for Leaf Recognition and Characterization"; 2011, IEEE.*

Casanova, D., et al., "IFSC/USP at ImageCLEF 2011: Plant identification task", CLEF 2012 Working Notes, vol. 1178, Sep. 7, 2014, entire article.

"Exif", Wikipedia, https://en.wikipedia.org/wiki/Exif (retrieved on Sep. 16, 2016).

Extended European Search Report for EP Patent Application No. 16169416.1 dated Nov. 28, 2016.

Extended European Search Report for EP Patent Application No. 16182582.3 dated Jan. 26, 2017.

Gonzales, J., et al., "Green", Wikipedia, https://en.wikipedia.org/wiki/Green (retrieved on Nov. 16, 2016).

Haug, S., et al., "A Crop/Weed Field Image Dataset for the Evaluation of Computer Vision Based Precision Agriculture Tasks", ECCV 2014 Workshops, vol. 8928, (2015), pp. 105-116.

Hess, M., et al., "Use of the extended BBCH scale—general for the descriptions of the growth stages of mono- and dicotyledonous weed species", Weed Research, vol. 37, No. 6, (1997), pp. 433-441.

Rejeb Sfar, Asma, et al., "Confidence Sets for Fine-Grained Categorization and Plant Species Identification", International Journal of Computer Vision, vol. 111, No. 3, (2014), pp. 255-275.

Rumpf, T., et al., "Sequential support vector machine classification for small-grain week species discrimination with special regard to *Cirsium arvense* and *Galium aparine*", Computers and Electronics in Agriculture, vol. 80, (2012), pp. 89-96.

Scharr, H., et al., "Leaf segmentation in plant phenotyping: a collation study", Machine Vision and Applications, vol. 27, No. 4, (2015), pp. 585-606.

Weyrich, M., et al., "Quality assessment of row crop plants by using a machine vision system", Proceedings of the Institute of Electrical and Electronics Engineers (IEEE) Industrial Electronics Society IECON 2013—39th Annual Conference, Vienna, Austria, Nov. 10-14, 2013, pp. 2466-2471.

International Search Report for PCT/EP2017/060750 dated Aug. 17, 2017.

International Search Report for PCT/EP2017/060751 dated Jul. 13, 2017.

Written Opinion of the International Searching Authority for PCT/EP2017/060750 dated Aug. 17, 2017.

Written Opinion of the International Searching Authority for PCT/EP2017/060751 dated Jul. 13, 2017.

* cited by examiner

RECOGNITION OF WEED IN A NATURAL ENVIRONMENT

CROSS-REFERENCE TO RELATED APPLICATIONS

This application is a national stage application (under 35 U.S.C. § 371) of PCT/EP2017/060750 filed May 5, 2017, which claims benefit of European Application No. 16169416.1, filed May 12, 2016, both of which are incorporated herein by reference in their entirety.

FIELD OF THE INVENTION

The invention relates generally to weed recognition, and more specifically to a method for recognizing a type of weed in a natural environment. The invention relates further to a recognition system for a recognition of a type of weed in a natural environment, a weed control method and a computer program product.

BACKGROUND

Farming is currently undergoing a new transition. After an industrialization of many farming processes and a series of automation initiatives, the introduction of high-tech tools in the farming process continues. The phenomenon of the Internet of Things (IoT) does not stop at the boundaries of agricultural fields. On the other side, farmers are more than interested in increasing the yield of harvesting. However, the yield is also a function of pest and/or weed within the fields. Consequently, farmers have used herbicides in order to fight weed. Such a treatment normally involves high costs. Therefore, farmers want to be on the save side when a decision is being made to use specific herbicides against specific weed. So far, farmers need to rely on their experience and their individual knowledge to identify weed when applying herbicides. However, choosing the right herbicides in the correct amount may be instrumental in order to save money and further protect the environment.

Therefore, there is a need for technical help for identifying weed in a farm field without the manual process of picking individual leafs of potential weed in the farm field and trying to identify the type of weed in a back-office using some literature. It is therefore an objective of the current application to provide a method and a system for identifying weed in a natural environment among crop.

SUMMARY

This need may be addressed by a method for recognizing of a type of weed in a natural environment, a recognition system for recognition of a type of weed in a natural environment, a weed control method and a computer program product, according to the independent claims.

According to one aspect of the present invention, a method for recognizing a type of weed in a natural environment may be provided. The method may comprise capturing a digital image of weed among cultivated crop in the natural environment, wherein the weed is in an early development stage, and contouring areas with a predefined color and texture specification in an RGB color model within the digital image building at least one contoured area comprising pixels relating to the weed within a boundary contour.

The digital image may be displayed together with a smallest of a predefined convex frame surrounding the contoured areas. Additionally, an indicator value may be displayed together with the digital image and the smallest of the predefined convex frame. The indicator may be indicative of a predefined quality criterion of the digital image based on determining that the smallest of the predefined convex frame covers a predefined minimum area of an available display area, and measuring a positive output value of a focus detector in respect to the contoured areas. The positive output value is related to an image sharpness of an area of the digital image within the contoured area.

The digital image may be stored only if the indicator value indicates that the digital image meets the predefined quality criterion, and the color information of the digital image outside the redefined convex frame may be reset. Additionally, the digital image may be sent—in particular to a server—for further examination, and a weed name of the weed of the captured image and a related probability value indicative of a probability of a match between the weed name and the weed of the captured digital image may be received back.

According to another aspect of the present invention, a recognition system for recognition of a type of weed in a natural environment may be provided. The recognition system may comprise a digital camera—in particular in a smartphone—adapted for capturing a digital image of weed among cultivated crop in the natural environment, wherein the weed is in an early development stage, and a contouring module adapted for contouring areas with a predefined color and texture specification in an RGB color model within the digital image building at least one contoured area comprising pixels relating to the weed within a boundary.

Furthermore, the recognition system may comprise a display adapted for displaying the digital image together with a smallest of a predefined convex frame surrounding the contoured areas, wherein the display is also adapted for displaying an indicator value together with the digital image and the smallest of the predefined convex frame. The indicator is indicating of a predefined quality criterion of the digital image based on a determination that the smallest of the predefined convex frame covers a predefined minimum area of an available display area, and a measurement of a positive output value of a focus detector in respect to the contoured area. The positive output value is related to an image sharpness of an area of the digital image relating to the contoured area.

An additional storage as part of the recognition system may be adapted for storing the digital image only if the indicator value indicates that the digital image meets the predefined quality criterion. A resetting unit may be adapted for resetting color information of the digital image outside the predefined convex frame.

Moreover, the recognition system may comprise a sender module adapted for sending the digital image for further examination, and a receiver adapted for receiving a weed name of the weed of the captured image and a related probability value indicative of a probability of a match between the weed name and the weed of the captured digital image.

It may be noted that the recognition system may be implemented as part of a smartphone and that the method for recognizing a type of weed in a natural environment may be implemented using a smartphone.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The proposed method for recognizing of a type of weed in a natural environment may offer a couple of advantages and technical effects:

Automatically detecting a type of weed and determining the correct weed name is of high value for farmers in the field. Weed in a crop field may change from season to season, from weather condition to weather condition and from one year to another year. In addition, the appearance of weed may change based on environmental conditions such that also specialists may not be able to identify a type of weed in a reliable manner. Especially during early development stages, it may be difficult to recognize small differences in the appearance of a specific weed. Using a camera, e.g., from a smartphone, taking a picture, performing a preanalysis within the smartphone and/or sending the picture to an analysis system may provide tremendous value for the farmer. He may decide instantly which type of herbicide to use in order to fight the developing weed among his crop. It may also help to apply the herbicide only at those areas where the weed has grown.

The task of capturing an image of a potential weed may also be performed by noneducated farmers, support personnel or temporary staff without any experience in recognizing weed. This may save valuable time and money in the farming process. The combination of a sort of pre-processing a captured image of weed in a smartphone and reducing the image information to a useful minimum, together with the usage of a high performance, highly sophisticated weed analysis system in the form of a neural network system may allow to determine the name of the weed and to send it back to the smartphone of the person having captured the weed image more or less instantly. The usage of metadata as input values for the neural network system generating the weed name together with the probability of one or more weed types and sending this information allows for sophisticated interaction between the farmer and the backend system. It also allows determining that weed name with a high probability and to advise the farmer how to proceed. Moreover, it may be possible to implement the neural network technology in high-performance multi-core bases smartphones or dedicated weed analysis systems.

Moreover, this whole process of capturing the image of the weed and receiving back the weed name—with a probability rating—may be performed within a very short amount of time, e.g., seconds. No special equipment, like special cameras, in the field may be required because smartphones are omnipresent today. Thus, the costs for the recognition process may also be kept comparably low in comparison to traditional technologies.

Additionally, the person taking the picture may receive help and hints in order to capture the image in a most adequate fashion in order to increase the probability for a correct determination and recognition of the weed at hand. The user of the image capturing device may get instantaneous advice during the image capturing process whether the quality of the image is expected to be high enough for a thorough analysis. The user may then adjust his image capturing behavior in order to increase the quality of the captured weed image.

Furthermore, the proposed method and system allows a recognition and determination of weed in a natural environment and not only in a glass house on artificial conditions. This may prove to be an invaluable advantage to farmers working in the field because everything can be achieved life and under the realistic daily working conditions. Recognizing weed in a natural environment has proven to be much harder than under glass house conditions because the number of variables is significantly higher. In a glass house there may be constant light, no direct sunshine or single light source related strong shadowing, no light angle variations related to time of the day, leading to changing and unpredictable reflections and color appearance no cloud, no fog or haze or varying soil conditions, no varying wetness conditions, no wind induced plant movement, no insect related leaf damage, just to name a few parameters why a recognition in a natural environment cannot be compared with a weed recognition in a glass house. Thus, all of the above-mentioned circumstances vary under natural conditions, which may represent a significant difference to partially known technologies for image recognition which rely typically on optimal and often artificial environmental conditions.

In the following additional embodiments of the proposed method for recognizing of a type of weed in a natural environment will be described:

According to one preferred embodiment of the method, the predefined color specification may relate to a color range of weed in a natural environment, featuring the complete visible range and in particular focus on the green color range of wavelength of, e.g., 490 to 575 nm. This may reduce "image noise" from background information also captured as part of the digital image. Also the background of the captured weed may comprise single or small groups of green pixels falling into this wavelength range. The contouring may eliminate this background green information spots. The allowable wavelength range (e.g., 490 to 575 nm) may be stored in a table, a database or another suitable data format.

The texture specification may relate to leaf veins, characteristic forms of leaf segments, specific patterning and color distribution, micro hairs on the surface atop of the leaf and on the edge of the leaf. All of these and additional characteristic textures may not explicitly be parameterized but belong to the "learnt" context of the trained classifier correlation function(s).

According to an additionally preferred embodiment of the method, the contouring the areas with the predefined color and texture specification may be performed by determining for every combined color of the digital image whether a combination of its color components may match one of a plurality predefined color combinations. Typically, image detectors function using the known RGB color model (red-green-blue) utilizing 3 sub-pixels for every complete pixel, wherein one sub-pixel is used for one of the 3 basic colors red, green and blue. The so specified color space boundaries with predefined color information and distribution of intensities within the RGB model of the sub-colors pixel information may be stored as reference. This way, a fast comparison between each pixel of the digital image and the stored reference color information may be performed by which a pixel of the captures digital image may be selected as part of the to-be-contoured area or not.

According to one advantageous embodiment of the method, contouring of areas with the predefined color specification may be performed additionally by a determination of $$w_i = F(p_i, p_{i,j}) \text{ wherein} \tag{Eq. 1}$$

$w_i = 1$ or 0 indicating that pixel i may belong to weed or not. This may be performed in addition to the more straight forward comparison against allowed color information for a single pixel. F may be a function calculating a probability for weed, respectively non-weed based on color attributes of $p_i$ and all of $p_j$, $p_i$=pixel i, and $p_{i,j}$=pixels j surrounding the pixel i. The number of pixels counted as surrounding pixel i may vary. E.g., only one ring or surrounding pixels may be used; this may be 8 pixels $p_{i,j}$. Moreover, a next ring of pixels $p_{i,j}$ surrounding the first ring may also be considered; this second ring may comprise additional 16 pixels $p_{i,j}$. Additional pixel rings may be considered and different rings may be multiplied with decreasing weighing factors the more distant a pixel ring is from pixel i. This may enable a more thorough determination whether a pixel of the captured digital image should count as weed pixel or not.

According to an additionally advantageous embodiment of the method, the indicator may be implemented as a color code of the predefined convex frame. A traffic light style color code may be used. E.g., a red colored frame may indicate that the quality or size or any other characteristic of the image may not be sufficient. A green frame may indicate that the captured image is usable for a further processing. And a yellow frame may indicate that the frame could be better but a further processing may be allowed but sub-optimal results may be expected. By moving the image capturing device or better focusing, the color of the frame may change immediately. This way, the user may get direct feedback about the quality of the image. He may have a good chance to improve the image quality by repositioning or refocusing the capturing device, e.g., the used smartphone. Other image quality criteria may also influence the color code of the frame surrounding the contoured area, like, e.g., the tilt angle of the camera.

According to one permissive embodiment of the method, the early development stage may be defined by a BBCH code from 10 to 39. Using the BBCH code (the international accepted code from Biologische Bundesanstalt, Bundessortenamt and CHemische Industrie in Germany) may help to achieve comparable results in an early development stage of weed. Typically, weed with a development stage according to BBCH code below 10, e.g., first leafs emerging, may not be recognizable even by an expert. Weed with a BBCH code larger or equal 40 may be too much grown up to fight it successfully with herbicides. However, also weed with a BBCH code below 10 may be recognized with a lower probability. Increased spectral analysis of the color information of the contoured area may be instrumental for achieving this.

According to one optional embodiment of the method, the captured displayed image may have a lower resolution than the stored digital image. Thus, the displayed image, which also may display the predefined convex frame around the captured weed image, may be presented to a user in a video stream-like form. Hence, the displayed image may change in accordance with a movement of the smartphone. For performance reasons, the image capturing process may be performed with a lower resolution than the maximal possible.

Thus, the user may recognize an increasing or decreasing indicator—i.e., better or worse quality of the digital image—immediately. However, a selected image out of the videostream may then be re-captured with the full available resolution of the camera, e.g., if a user may press the capture button. This may enhance the probability of a correct weed recognition.

Therefore, it may be an option in one embodiment of the method that the step of capturing the same digital image at a higher resolution than the initially captured digital image, may comprise re-performing the steps of contouring and measuring a positive output value of a focus detector using the digital image with the higher resolution. Thus, the steps may be repeated with the higher resolution image to provide the best possible image quality for further processing, i.e., weed recognition.

According to one preferred embodiment of the method, the measuring a positive output value of the focus detector may comprise applying a Laplace filter conversion of a digital greyscale image, which may be derived from the captured digital image, wherein a standard deviation of greyscale intensities of pixels lying within an area masked by the contoured areas. Additionally, a sharpness factor may be derived as a squared standard deviation. The image may have been derived by a transform from an RGB color model to another color model, e.g., HSV (hue, saturation, value), HSL (hue, saturation, lightness/luminance). Using the specific implementation alternative having the squared standard deviation, larger intensity differences may be weighted higher, which may improve the quality of the recognition process.

According to a further preferred embodiment of the method, the resetting the color information also may comprise resetting color information of areas of the digital image outside the related boundary contour. This has the advantage that the required storage requirements for the captured digital image may be reduced. This may also be advantageous when sending the digital image or a pre-processed version of it. In addition to a shape exclusion of color information directly outside the contoured area also a framing environment of the contour may be excluded from the resetting. Thus, a small edge environment—e.g., several pixels wide—at edges of the contoured area may not be reset in respect to color values but keep the original color information. This has also the advantage of a better recognition of the displayed image by a user of the display, e.g., the user of the smartphone. Basically, the reset areas may be reset to a black color value. However, any other default color—e.g., apart from green—may be used.

According to an optional embodiment, the method may comprise, in case the weed is a monocotyledon, that the capturing the digital image is performed with a digital image plane—in particular a capturing plane which may also be the sensor plane—being parallel to a longitudinal expansion of the monocotyledon plus or minus a predefined first delta angle. I.e., ideally such a weed may be captured from a position directly from the side of the monocotyledon, e.g., a grass. For practical reasons, it may not be required to hold the camera completely parallel to the vertical extension of the weed. E.g., plus or minus 10° may be allowed. Alternative angle value may include 5°, 15°, 20°, 25° or 30°. Hence, the image plane or sensor plane (without mirrors) may be parallel to the soil. An alternative solution in capturing weed of type monocotyledon may be to pinch the monocotyledon and lay it more or less flat on the ground or soil. In this case, the weed may be captured from above.

According to another optional embodiment, the method may comprise, in case the weed is a dicotyledon, that the capturing the digital image is performed with a digital image plane being parallel to the natural environment surrounding the weed plus or minus a predefined second delta angle, i.e., direct from above the dicotyledon. Also here, for practical reasons, plus or minus a predefined deviation from the perfect parallelism may be allowed, e.g., + or −10°. The same alternative angles, as discussed above, may apply here. Typically, the potential weed may be projected into the middle of an image capturing device, i.e., the image sensor. A good positioning would be recognizable by the display.

According to one additionally advantageous embodiment of the method, a further examination may comprise applying at least one trained classifier correlation function comprising neural network classifiers and sample based identifiers both for weed and single leafs to the captured digital image for recognizing the weed, wherein the correlation function may have access to names of types of weeds together with a plurality of sets of metadata per weed type. The available smartphone's performance is ever increasing. Therefore, neural network classifiers may be implemented as part of the smartphone, either in software form or as a hardware module. This may eliminate the need to send the digital image to a powerful server for further processing, i.e., weed recognition. Instead, the weed recognition may be performed directly in the smartphone. Additionally, the found results together with the captured digital image and/or the contoured area(s) may be transmitted from the smartphone to a server, typically wirelessly.

Other metadata used by the classifier correlation function may include but not be limited to the country the image has been captured, a date from which season information may be derived, a device type of the image capturing device (because different camera models may have different color representation models or sensitivities), device orientation, device distance to the weed, data from an accelerometer of the camera, brightness of the environment, soil characteristics (e.g., composition, conductivity), weather history, past results of weed resignation from the same environment (same place), comparison with a weed map, past treatment with herbicides (in order to determine a potential resistance, and coverage of the soil with weed (e.g., measured or estimated in percent).

According to a further enhanced method, the method for recognizing a type of weed in a natural environment may be used for weed control, wherein a name of an herbicide is selected out of a database and is received together with the weed name and the probability. This may enable a farmer to select a particular herbicide in order to fight the weed. Advantageous may be an embodiment if the local weather and seasonal conditions may be reflected. This way the farmer may get direct access to the knowledge base or database of a central knowledge hub and he may only use as much herbicide as required under the local weather and seasonal conditions. This may reduce his expenditures for fighting weed on his farmland.

Furthermore, embodiments may take the form of a related computer program product, accessible from a computer-usable or computer-readable medium providing program code for use, by or in connection with a computer or any instruction execution system, like a smartphone. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that aspects of the invention are described with reference to different subject-matters. In particular, some embodiments are described with reference to method type claims whereas other embodiments have been described with reference to device type claims. However, a skilled person of the art will gather from the above and the following description that, unless otherwise notified, in addition to any combination of features belonging to one type of subject-matter, also any combination between features relating to different subject-matters, in particular, between features of the method type claims, and features of the device type claims, is considered as to be disclosed within this document.

The aspects defined above and further aspects of the present invention are apparent from the examples of embodiments being described hereinafter. They are explained with reference to the examples of embodiments, but to which the invention is not limited.

Preferred embodiments of the invention will be described, by way of example only, and with reference to the following drawings:

FIG. 4 a, b, c show embodiments of steps of an area contouring process.

FIG. 5 a, b illustrates a concept of including further rings of pixels in the contouring process.

DETAILED DESCRIPTION

In the context of this description, the following conventions, terms and/or expressions may be used:

The term 'recognizing', in particular 'recognizing a type of weed' may denote an automated machine-based determination or recognition process for a specific type of weed starting from a digital image with a digital camera, pre-processing of the digital image, deriving metadata from the digital image and use these by, e.g., neural network based classifiers for a probability based analysis of the image data, and finally a recognition of one or more type(s) of weed.

The term 'weed' may denote an unwanted plant of any species that can quickly adapt to any environment. Here, the expression weed may also be related to plant among crop or cultivated or economic plants that are useful in the sense of harvesting fruits of grown up seed. Weed may disturb the process of the growth of the crop and decrease the yield of an agriculture field.

The term 'natural environment' may—in the context of plants like crop or weed—denote that the plants grow in a field or on land which may be exposed to natural weather and environmental conditions, like humidity and direct or indirect sun light. Hence, natural environment excludes artificial environments like glass houses or other non-natural growing environments for plants. Such unnatural environments with controlled conditions may artificially exclude numerous influence factors, which make the recognition process much harder or—in many cases—impossible. This feature may prove to be an advantage of the currently proposed method and system because it may be much easier to differentiate between crop and weed in an artificially controlled environment. Under extremely controlled conditions it may be much easier to recognize a specific type of weed because a large number of types of weeds may be excluded upfront given the specific and controlled conditions of, e.g., a glass house.

The term 'capturing an image' may denote the classical process of making a photograph, however, in digital form. For capturing a digital image, some well-known optical elements together with an image sensor may be required, as can be found in typical digital newcomers these days. Such digital cameras have become an often implemented feature in a smartphone. The term 'capturing an image' may denote the process of taking a digital picture.

The term 'early development stage' may denote a stage of a plant in which the plant, in particular the weed, may not have grown to an adult stage. Very early development stages may be difficult to recognize anyway. It has been shown that the usage of the 'BBCH code' may be useful when describing development stages of plants, e.g., weed. The abbreviation BBCH stands officially for "Biologische Bundesanstalt, Bundessortenamt and Chemische Industrie" and describes phenological development stages of a plant. The code goes from 00 to 99. A BBCH code of 10 to 19 represents different early development stadiums of leafs. The principal growth stage 2 includes BBCH codes 20 to 29 and is about formation of side shoots/tillering. The principal growth stage 3 (BBCH codes 30 to 39) comprises stem elongation/shoot development (main shoot). Thus, focusing on weed with BBCH codes between 10 and 39 may represent a good focus on weed in an early development stage.

The term 'contouring' may denote a process of a determination of a contour of a certain area or surface having common color and/or textual characteristics of, e.g., weed in a digital picture. Each leaf of plants, in particular weed, has a natural boundary or outer edge r edges of the leaf. The process of contouring captures, recognizes or determines these edges such that inside the related contoured area all or almost all pixels of the weed may be included.

The term 'color and texture specification' may denote digital information about pixels in a digital image according to a color model, e.g., the RGB color model (red, green, blue). However, other color models may be used, like HSV (hue, saturation, value), HSL (hue, saturation, lightness/luminance). It is well known in the industry that most color model information from one color model may be transformed to another color model by a mathematical matrix operation. Different color models may have different advantages like most natural color representations, best suitable for digital processing, optimally adapted for grayscale processing, best suited for edge recognition and thus for contouring, and so on.

The term 'RGB color model' may denote the well-known additive color model in which red, green, and blue lights are added together in various ways to reproduce a broad array of colors. The name of the model comes from the initials of the three additive primary colors, red, green, and blue. The main purpose of the RGB color model is for the sensing, representation, and display of images in electronic systems, such as televisions and computers, though it has also been used in conventional photography. Before the electronic age, the RGB color model already had a solid theory behind it, based in human perception of colors. RGB is a device-dependent color model: different devices may detect or reproduce a given RGB value differently since the color elements (such as phosphors or dyes) and their response to the individual R, G, and B levels vary from manufacturer to manufacturer, or even in the same device over time. Thus, an RGB value may not define the same color across devices without some kind of color management and mathematical transformations.

The term 'convex frame' may denote a closed frame surrounding an object captured as part of a digital image. The frame may comprise individual connected lines like a closed polygon. The term 'convex' may denote that there are no concave sub-portions as element of the convex frame. Thus, each two sets of connecting lines may never have an inner angle—i.e., oriented to the inner side of the frame—larger than 180°. It may be advantageous to use a regular or symmetrical frame, like a triangle, a square, a rectangle, a pentagon, a hexagon, a parallelogram, and so on.

The term 'focus detector' may denote a device adapted for determining whether a captured digital image is sharp in an optical sense. This means that the picture plane and the projection plane are selected according to optical laws of the used lens or lenses.

The term 'quality criterion' may denote a criterion that may be related to a quality of a digital image, in particular of the captured weed. It may, e.g., require that a smallest of a predefined convex frame requires a minimum amount of the total available size of the digital image, e.g., 10% or more (e.g., 90%, other values are also possible; typically 30 to 50%), and that a predefined minimum sharpness of the captured area relating to the weed may be achieved. The first requirement (smallest of a predefined convex frame) may ensure that enough digital picture information is available related to the weed; and the second criterion (sharpness) may ensure that a minimum quality of the digital image is guaranteed. A recognition of weed from non-sharp digital images may be extremely difficult or impossible.

The term 'classifier correlation function', and in particular 'trained classifier correlation function' may denote one or more mathematical function allowing to measure a similarity of features between one or more sections of a captured image and a pre-trained set of reference image data. The feature parametrization of a correlation function may not be programmed manually but may be trained, i.e., learned using datasets with a known plurality of input attributes as well as the desired result. A skill person will know various types of correlation approaches.

Actually, this approach is also used for the texture specification. No direct parameters are specified but automatically derived during the training sessions of the classifier correlation function(s).

In the following, a detailed description of the figures will be given. All instructions in the figures are schematic. Firstly, a block diagram of an embodiment of the inventive method for recognizing of a type of weed in a natural environment is given. Afterwards, further embodiments as well as embodiments of the recognition system for a recognition of a type of weed in a natural environment will be described.

Figure 1:
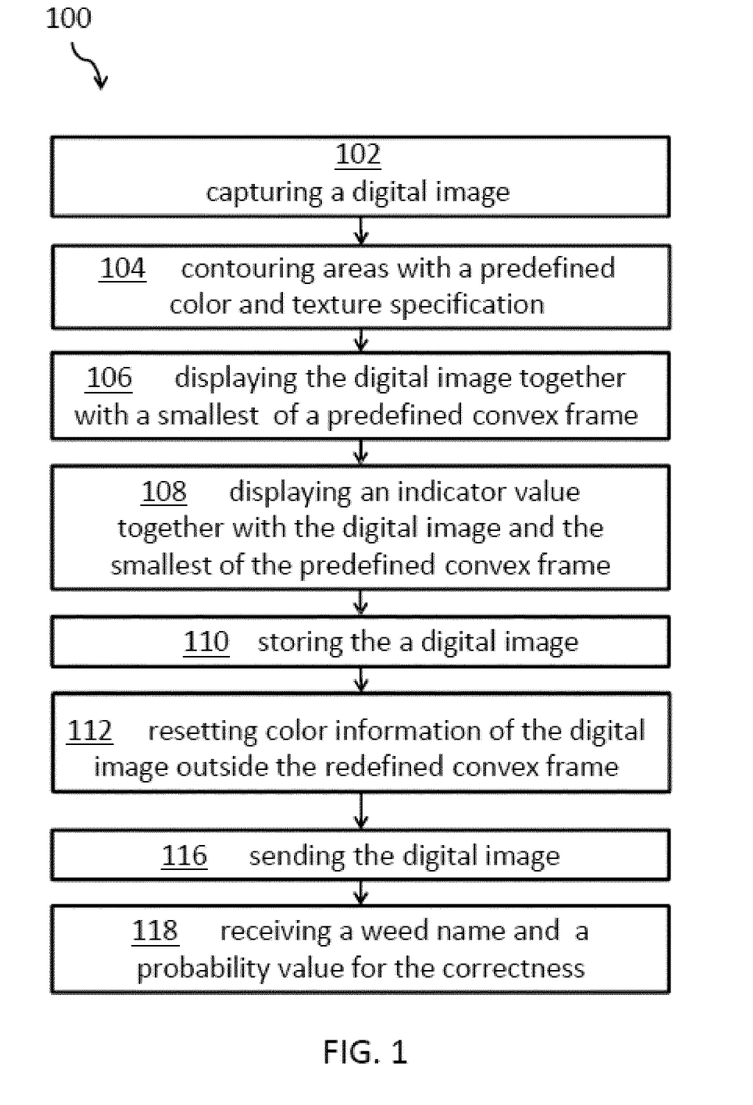
FIG. 1 shows a block diagram of an embodiment of the inventive method for recognizing of a type of weed in a natural environment.

FIG. 1 shows a block diagram of an embodiment of the method 100 for recognizing a type of weed in a natural environment. The method comprises a plurality of steps, namely: capturing, 102, a digital image—in particular a colored image—of a weed among cultivated crop in the natural environment, which should explicitly not be an artificial or green house environment. The weed is in an early development stage. The method comprises further contouring, 104, areas with a predefined color and texture specification in an RGB color model within the digital image. Typically, one may expect one contoured area from one weed plant. However, there may also be more than one contoured area from different, potentially not connected leafs, from two weed plants, or the like.—Such a detection or determining process detects boundaries of green areas of the digital image. During this process at least one contoured area—e.g., one or more leafs, as well as one or more weed plants—may be built comprising pixels relating to the weed within a boundary contour. However, it may also be possible, that the digital image has captured more than one leaf and/or the stem. Consequently, more than one contoured area may be determined.

Next, the captured digital image is displayed, 106, together with a smallest of a predefined convex frame. Such a frame may preferably be a rectangular frame. However, also other frame shapes may be allowed like a circle, a parallelogram, a triangle, a pentagon, a hexagon, and so on. For practical reasons, the convex frame may have a symmetrical form, which may be advantageous during calculation processes. A display of the smartphone may be used for this.

Together with the digital image and the smallest of the predefined convex frame—in particular a predefined convex frame shape—an indicator value is displayed, 108. The indicator value is indicating of a predefined quality criterion of the digital image. This may be based on determining that the smallest of the predefined convex frame covers a predefined minimum area—e.g., 10% to 90%, typically 50%—of an available display area. This may ensure a minimum size of the digital image in comparison to the maximum display or image size. As can be understood, the higher the percentage is the better is the resolution of the captured weed image. Additionally, the indicator value is based on a measurement of a positive output value of a focus detector in respect to the contoured areas. This may ensure a minimum required sharpness of the captured weed leaf. It may be understood, that several techniques for ensuring optical sharpness of the captured weed may be applied, e.g., histogram functions working on single intensity values of a specific color model. This implies that the positive output value is related to an image sharpness of an area of the digital image relating to the contoured area, and thus, to a leaf or a group of leafs. The indicator may be displayed in form of a color coding—in particular traffic light colors—of the smallest frame surrounding the captured area, i.e., the leaf(s) of the weed. However, also numerical value, a slider indicator or other displayed of sound indicator types may be applicable.

The method further comprises storing, 110, the digital image only if the indicator value indicates that the digital image meets the predefined quality criterion. Next, color information of the digital image outside the redefined convex frame is reset, 112, before the digital image may be sent, 116—in particular to a server, e.g., for further examination. Based on that further examination, a weed name or a plurality of weed names of the weed of the captured image and a related probability value may be received, 118. The probability value may be indicative of a probability of a match between the determined weed name and the weed of the captured digital image. Additionally, also a typical picture of the weed may be received and displayed together with the name and the probability value for the correctness of the recognition. For the determination of the weed name and the probability value cognitive computing technologies may be applied. This may include one or more neural network systems.

Figure 2:
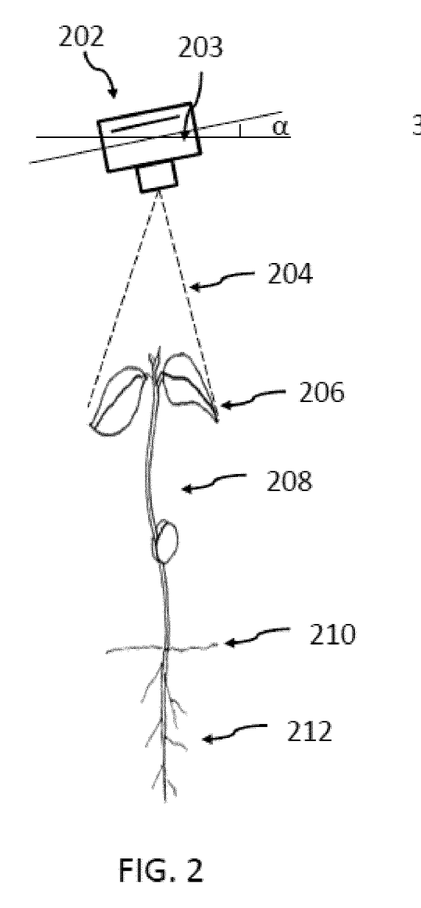
FIG. 2 shows a block diagram of an embodiment for capturing a dicotyledon.

FIG. 2 shows a plant, in particular weed and an image capturing device 202. This may be a camera of a smartphone (not shown). The camera may have an objective and a certain opening angle 204. The captured digital image may capture the leaf(s) 204 of the weed, here a dicotyledon. The stem 208 may, e.g., be covered by the one or more leafs 206.

In the crosssection also the earth surface 210 and the root 212 of the weed is shown. In an optimal case, the camera's image plane 202 may be completely parallel to a longitudinal extension of the leafs 206, i.e., along the earth surface. However, smaller deviations indicated by the angle $\alpha$ may be acceptable. If the angle $\alpha$ may exceed a predefined threshold value, it may be indicated by the above-mentioned indicator. FIG. 2 is directed towards dicotyledon. The indicator may also anticipate that the leafs of the weed may not grow parallel to the soil surface. Thus, in special cases, other tilt angles than 10° may be allowable. A blocking of a capturing the image, e.g., by a red flame, may be overwritten by a user. It may be assumed that the image detector 203 is vertical to the objective of the camera 202.

It may also be noted that the digital image may not only have captured more than one leaf of a weed, but also more than a plant of potential weed. However, ideally, each captured image would only have one weed plant or leaf for an easier recognition process.

Figure 3:
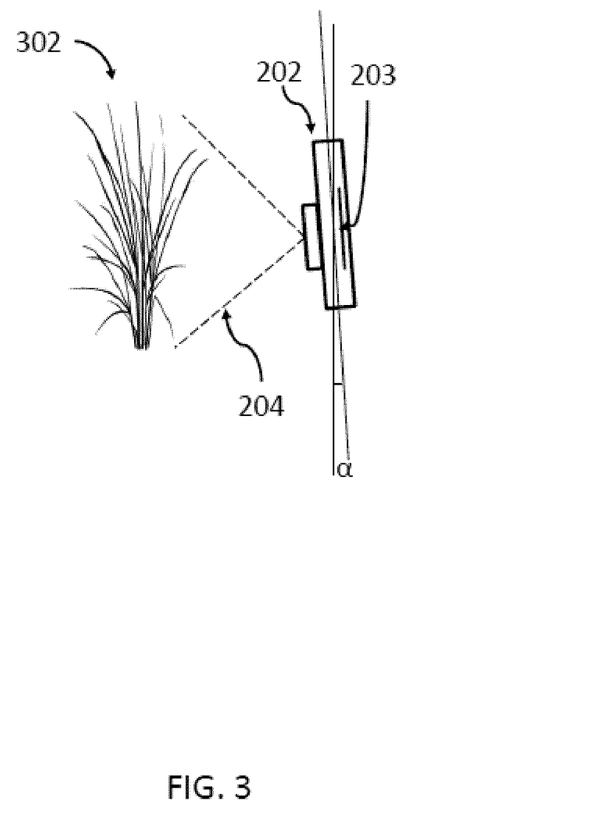
FIG. 3 shows a block diagram of an embodiment for capturing a monocotyledon.

FIG. 3 shows a comparable scenario for monocotyledon, e.g. grass. Capturing a digital image from above may not reveal enough information for a classification and determination of the type of weed. Therefore, monocotyledon may be digitally photographed from the side of the plant, or the weed may be extracted from the soil and put flat on the soil. In that case, a capturing of the weed may be performed as discussed in the case of FIG. 2. Otherwise, the optical capturing plane 203 of the digital camera 202 should be vertical to the earth surface. Also here, smaller deviation indicated by the angle $\alpha$ may be acceptable. If the angle $\alpha$ may exceed a predefined threshold value, it may be indicated by the above-mentioned indicator.

Figure 4:
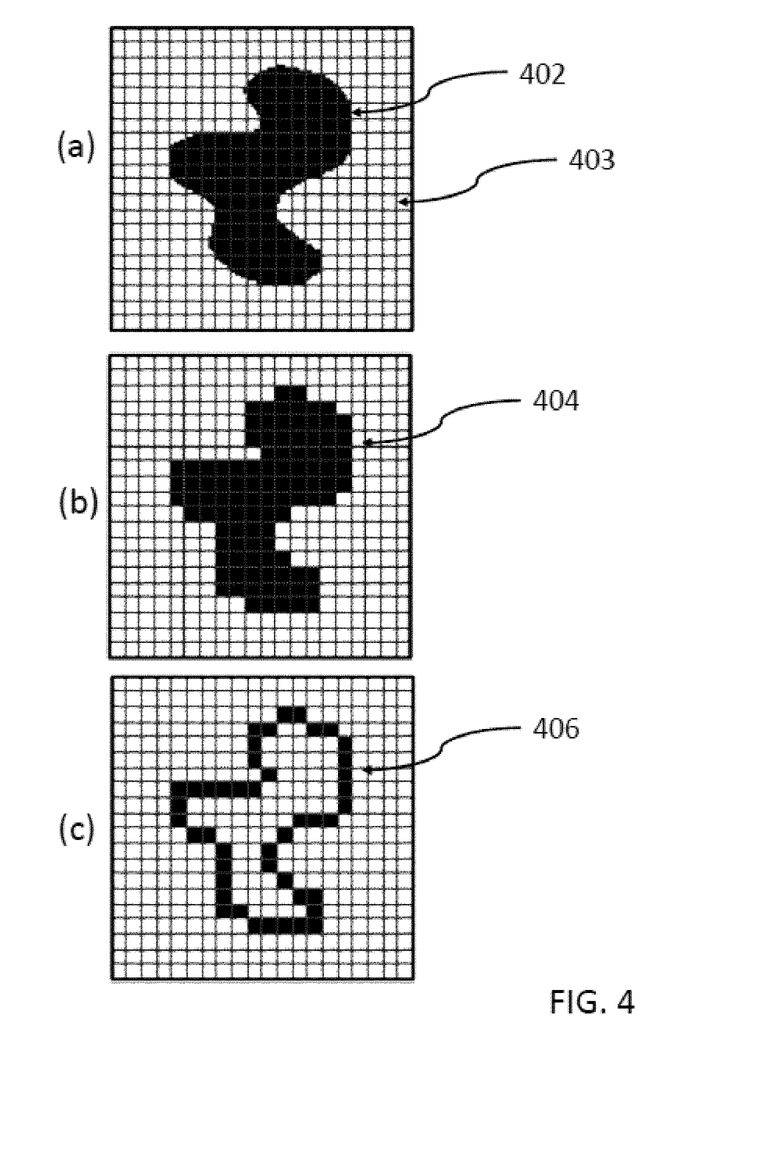

FIG. 4a, 4b, 4c show the process of contouring. FIG. 4a shows a projection of a weed leaf 402 on an image sensor 203 and/or a respective matrix of pixels. Each small square 403 may represent one pixel. A skilled person will acknowledge that for the purpose of explanation a very coarse-grained matrix is used here. Typically, the camera may have a resolution of several million pixels. FIG. 4b shows the result of a digitization, 404. Now, the smooth edges of the leaf 402 are gone and the originally analogue shape is digitized. In a next step—FIG. 4c—the contour of the potential leaf may be extracted from the digital image. Everything inside the contour 406 may be counted as a leaf pixel.

Figure 5A:
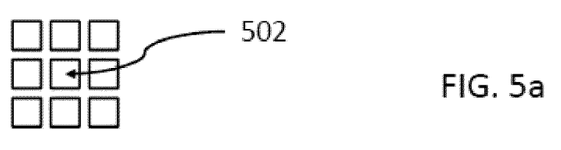

FIG. 5a shows details of the determination process whether a certain pixel may belong to a weed leaf or not. In the simplest case, the color value of a simple pixel $p_i$ 502 is used as determination criterion. The related color range may comprise, e.g., wavelengths of 495 to 575 nm. However, sometimes such a simple differentiation may not be sufficient. Therefore, pixels surrounding the pixel 502 in question are also taken into account. FIG. 5 shows a first "ring" of additional pixels directly surrounding pixel 502. Equation (1) may be used to also use the information related to pixel $p_i$ 502.

Figure 5B:
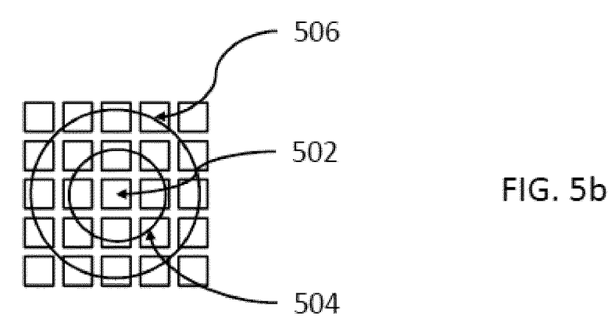

FIG. 5b shows in addition to the first "ring" 504 of pixels surrounding pixel 502 a second "ring" 506 of surrounding pixels. The influence or weighing of the decision whether pixel 502 is determined to be a leaf pixel or not, may decrease the further away a certain pixel may be from the pixel 502 in question. Further rings of pixels $p_{i,j}$ may be used and may become variables of the function F. The number of rings used may be a function of the total resolution of the image sensor.

Figure 6:
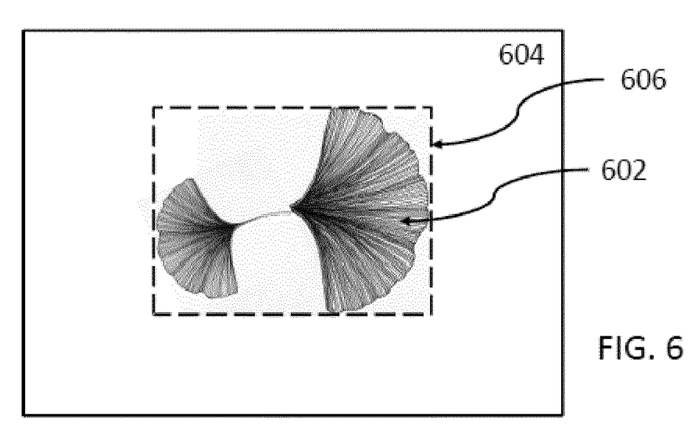
FIG. 6 shows an embodiment of a display with an image of weed and the convex frame.

FIG. 6 shows a digital image 502 of weed comprising two leafs on a display 604. A smallest convex frame is shown in form of a dotted line rectangular frame 606. The color of this rectangular frame 606 may be used as indicator value. E.g., a red colored frame may indicate that the quality of the digital image of weed 602 may not be sufficient. If the quality of digital image of the weed 602 increases, the color of the frame 606 may turn to yellow. If the quality is sufficient regarding the quality criterion for a further processing and a recognition process of the weed, the frame's 606 color may be converted to green. However, other color values may be used. Additionally, or as an alternative, there may also be a display of a numeric value on the screen 600 for a traffic light symbol or any other easy to interpret indicators. Additionally, the determined quality of the digital image of the weed 602 may also be indicated by sound. This could be speech synthesis or any other acoustic signal combination.

Figure 7:
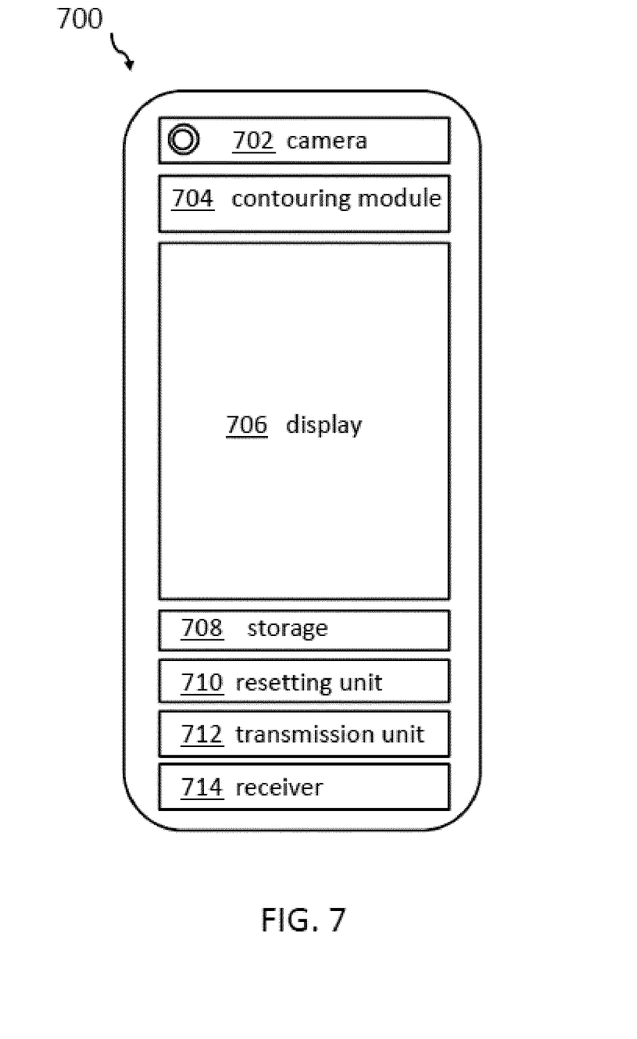
FIG. 7 shows a block diagram of an embodiment of the weed recognition system.

FIG. 7 shows a block diagram of an embodiment of the recognition system 700 for recognition of a type of weed in a natural environment. The recognition system comprises a digital camera 702 adapted for capturing a digital image of a weed among cultivated crop in the natural environment. The weed should be in an early development stage. A contouring module 704 is adapted for contouring areas with a predefined color and texture specification in an RGB color model within the digital image building at least one contoured area comprising pixels relating to the weed within a boundary.

A display 706 is adapted for displaying the digital image together with a smallest of a predefined convex frame surrounding the contoured area, in which the display 706 is also adapted for displaying an indicator value together with the digital image and the smallest of the predefined convex frame. The indicator is indicating of a predefined quality criterion of the digital image. This may be based on a determination that the smallest of the predefined convex frame covers a predefined minimum area of an available display area, and a measurement of a positive output value of a focus detector in respect to the contoured area, wherein the positive output value is related to an image sharpness of an area of the digital image relating to the contoured area. The display 706 may be the, e.g., touch-sensible, display of a smartphone.

The digital image may then be stored into storage 708 only if the indicator value indicates that the digital image meets the predefined quality criterion. A resetting unit 710 is adapted for resetting color information of the digital image outside the redefined convex frame, a transmission unit or sender 712 is adapted for sending the digital image for a further examination, and a receiver 714 is adapted for receiving a weed name of the weed of the captured image and a related probability value indicative of a probability of a match between the weed name and the weed of the captured digital image. This way, a farmer—even an experienced one—may be able to differentiate between different types of weed on his field among crop.

Figure 8:
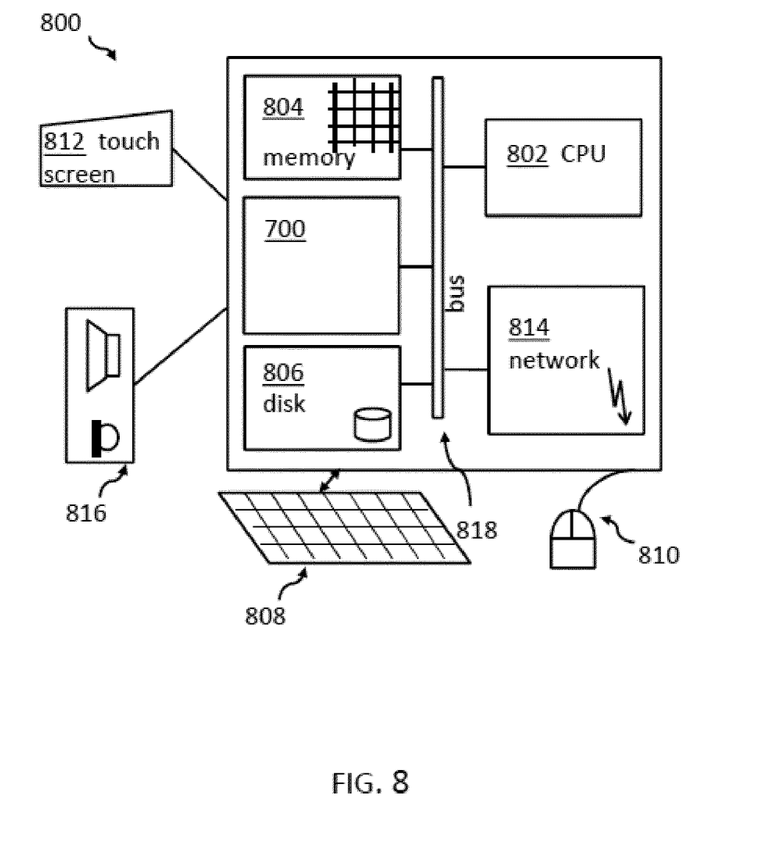
FIG. 8 shows an embodiment of a computing system comprising the recognition system.

Embodiments of the invention may be implemented together with virtually any type of computer—in particular a smartphone—regardless of the platform being suitable for storing and/or executing program code. FIG. 8 shows, as an example, a computing system 800 suitable for executing program code related to the proposed method. Beside smartphones also other mobile devices with a camera, a processor for executing program code and a transceiver may be suited for the implementation of the proposed method and/or related recognition system.

The computing system 800 is only one example of a suitable computer system and is not intended to suggest any limitation as to the scope of use or functionality of embodiments of the invention described herein. Regardless, computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system 800 include, but are not limited to, tablet computers, hand-held or laptop devices, multiprocessor systems, microprocessor-based systems, programmable consumer electronics, smartphones, and digital camera with spare computing capacity that include any of the above systems or devices, and the like. Computer system 800 may be described in the general context of computer system-executable instructions, such as program modules, being executed by a computer system 800. Generally, program modules may include routines, programs, objects, components, logic, data structures, and so on that perform particular tasks or implement particular abstract data types.

As shown in the figure, computer system 800 is shown in the form of a general-purpose computing device. The components of computer system 800 may include, but are not limited to, one or more processors or processing units 802, a system memory 804, and a bus 818 that couples various system components including system memory 804 to the processor 802. Computer system 800 typically includes a variety of computer system readable media. Such media may be any available media that is accessible by computer system 800, and it includes both, volatile and non-volatile media, removable and non-removable media.

The system memory 804 may include computer system readable media in the form of volatile memory, such as random access memory (RAM) and/or cache memory. Computer system 800 may further include other removable/non-removable, volatile/non-volatile computer system storage media. By way of example only, storage system 812 may be provided for reading from and writing to a non-removable storage chip. Storage media can be connected to bus 806 by one or more data media interfaces. As will be further depicted and described below, memory 804 may include at least one program product having a set (e.g., at least one) of program modules that are configured to carry out the functions of embodiments of the invention.

A program/utility, having a set (at least one) of program modules, may be stored in memory 804 by way of example, and not limitation, as well as an operating system, one or more application programs, other program modules, and program data. Program modules may generally carry out the functions and/or methodologies of embodiments of the invention as described herein.

The computer system 800 may also communicate with one or more external devices such as a keyboard, a pointing device, a display 820, etc.; these devices may be combines in a touch-screen that enable a user to interact with computer system 800; and/or any devices (e.g., network card, modem, etc.) that enable computer system 800 to communicate with one or more other computing devices. Such communication can occur via input/output (I/O) interfaces. Still yet, computer system 800 may communicate with one or more networks such as a local area network (LAN), a general wide area network (WAN), and/or a mobile public network (e.g., the Internet) via network adapter 822. As depicted, network adapter 814 may communicate with the other components of computer system 800 via bus 818. It should be understood that although not shown, other hardware and/or software components could be used in conjunction with computer system 800. Examples, include, but are not limited to: microcode, device drivers, redundant processing units, etc.

Additionally, the recognition system 700 for recognition of a type of weed in a natural environment may be attached to the bus system 818.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semiconductor system for a propagation medium, like e.g., solid state memory, a random access memory (RAM), a read-only memory (ROM).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device such as an EPROM, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the respective computing devices, e.g. as a smartphone app from a service provider via a mobile network connection.

Computer readable program instructions for carrying out operations of the present invention may be any machine dependent or machine independent instructions, microcode, firmware instructions, state-setting data, or either source code or object code written in any combination of one or more programming languages, including an object-oriented programming language such as C++, Java or the like, and conventional procedural programming languages, such as the "C" programming language or similar programming languages. The computer readable program instructions may execute entirely on the computer device. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The invention claimed is:

1. A method for recognizing a type of weed in a natural environment comprising:
   capturing a digital image of a weed among cultivated crop in the natural environment, wherein the weed is in an early development stage, wherein the early development stage is defined by a BBCH code from 10 to 39,
   contouring areas with a predefined color and texture specification in an RGB color model within the digital image building at least one contoured area comprising pixels relating to the weed within a boundary contour,
   sending the digital image for a further examination,
   applying, to the digital image, a filter conversion of a digital greyscale image, which is derived from the digital image, wherein a standard deviation of greyscale intensities of pixels lying within an area is masked by the contoured areas, and wherein a sharpness factor is derived as a squared standard deviation; and
   receiving, based on the further examination, a weed name of the weed of the captured image and a related probability value indicative of a probability of a match between the weed name and the weed of the captured digital image.

2. The method according to claim 1, further comprising:
   displaying the digital image together with a smallest of a predefined convex frame surrounding the contoured areas,
   displaying an indicator value together with the digital image and the smallest of the predefined convex frame, wherein the indicator is indicating of a predefined quality criterion of the digital image based on
      determining that the smallest of the predefined convex frame covers a predefined minimum area of an available display area, and
      measuring a positive output value of a focus detector in respect to the contoured areas, wherein the positive output value is related to an image sharpness of an area of the digital image relating to the contoured area, and
   storing the digital image only if the indicator value indicates that the digital image meets the predefined quality criterion.

3. The method according to claim 1, further comprising:
   resetting color information of the digital image outside a predefined convex frame, and/or
   resetting color information of areas of the digital image outside the related boundary contour.

4. The method according to claim 1, wherein the predefined color specification relates to a color range of weed in a natural environment, in particular the green color range of wavelength 490 to 575 nm.

5. The method according to claim 1, wherein the contouring areas with the predefined color and texture specification is performed by
   determining for every pixel of the digital image whether a combination of its color components matches one of a plurality predefined color combinations.

6. The method according to claim 1, wherein the contouring of areas with the predefined color specification is performed additionally by a determination of
   $wi=F(pi,pi,j)$, wherein
   wi=1 or 0 indicating that pixel I belongs to weed or not,
   F is a function calculation a probability for weed/non weed based on color attributes of pi and all of pj,
   pi=pixel i,
   pi,j=combined pixels j surrounding the pixel i.

7. The method according to claim 1, wherein the indicator is implemented as a color code of a predefined convex frame.

8. The method according to claim 1, wherein the captured displayed image has a lower resolution than the digital image.

9. The method according to claim 1, wherein the storing the digital image comprises also performing a step of capturing the same digital image at a higher resolution than the initially captured digital image, performing the step of contouring and a step of measuring a positive output value of a focus detector using the digital image with the higher resolution.

10. The method according to claim 1,
    wherein, in case the weed is a monocotyledon, the capturing the digital image is performed with a digital image plane being parallel to a longitudinal expansion of the monocotyledon plus or minus a predefined first delta angle; and/or
    wherein, in case the weed is a dicotyledon, the capturing the digital image is performed with a digital image plane being parallel to the natural environment surrounding the weed plus or minus a predefined second delta angle and/or projecting the weed into the middle of an image capturing device.

11. The method according to claim 1, wherein the further examination comprises
    applying at least one trained classifier correlation function comprising neural network classifiers and sample based identifiers, both for weed and single leafs, to the captured digital image for recognizing the weed, wherein the correlation function has access to names of types of weeds together with a plurality of sets of metadata per weed type.

12. A method of weed control using the method according to claim 1, wherein a name of an herbicide is selected out of a database and is received together with the weed name and the probability.

13. A system for a recognition of a type of weed in a natural environment among cultivated crop, wherein the weed is in an early development stage, the recognition system comprising
    a digital camera adapted for capturing a digital image of the weed in the natural environment,
    a contouring module adapted for contouring areas with a predefined color and texture specification in an RGB color model within the digital image building at least one contoured area comprising pixels relating to the weed within a boundary,
    a sender adapted for sending the digital image for a further examination,
    a filter adapted for applying, to the digital image, a filter conversion of a digital greyscale image, which is derived from the digital image, wherein a standard deviation of greyscale intensities of pixels lying within an area is masked by the contoured areas, where wherein a sharpness factor is derived as a squared standard deviation; and
    a receiver adapted for receiving, based on the further examination, a weed name of the weed of the captured image and a related probability value indicative of the probability of a match between the weed name and the weed of the captured digital image.

14. The system according to claim 13, further comprises:
a display adapted for displaying the digital image together with a smallest of a predefined convex frame surrounding the contoured areas, wherein the display is also adapted for displaying an indicator value together with the digital image and the smallest of the predefined convex frame, wherein the indicator is indicating of a predefined quality criterion of the digital image based on
- a determination that the smallest of the predefined convex frame covers a predefined minimum area of an available display area, and a measurement of a positive output value of a focus detector in respect to the contoured area, wherein the positive output value is related to an image sharpness of an area of the digital image relating to the contoured area, and
a storage adapted for storing the digital image only if the indicator value indicates that the digital image meets the predefined quality criterion.

15. The system according to claim 13, further comprises:
a resetting unit adapted for resetting color information of the digital image outside a predefined convex frame, and/or
resetting color information of areas of the digital image outside the related boundary contour.

16. A non-transitory computer-readable medium having stored thereon a computer program product for recognizing of a type of weed in a natural environment among cultivated crop, wherein the weed is in an early development stage, wherein the early development stage is defined by a BBCH code from 10 to 39, said computer program product comprising program instructions embodied therewith, said program instructions being executable by one or more computing devices to cause said one or more computing devices to
capture a digital image of the weed in the natural environment,
contour areas with a predefined color and texture specification in an RGB color model within the digital image building at least one contoured area comprising pixels relating to the weed within a boundary contour,
display the digital image together with a smallest of a predefined convex frame surrounding the contoured areas,
display an indicator value together with the digital image and the smallest of the predefined convex frame, wherein the indicator is indicating of a predefined quality criterion of the digital image based on
send the digital image for a further examination,
apply, to the digital image, a filter conversion of a digital greyscale image, which is derived from the digital image, wherein a standard deviation of greyscale intensities of pixels lying within an area is masked by the contoured areas, and wherein a sharpness factor is derived as a squared standard deviation; and
receive, based on the further examination, a weed name of the weed of the captured image and a related probability value indicative of a probability of a match between the weed name and the weed of the captured digital image.

17. The computer program according to claim 16, wherein said program instructions being executable by one or more computing devices to cause said one or more computing devices to
displaying the digital image together with a smallest of a predefined convex frame surrounding the contoured areas,
displaying an indicator value together with the digital image and the smallest of the predefined convex frame, wherein the indicator is indicating of a predefined quality criterion of the digital image based on
determining that the smallest of the predefined convex frame covers a predefined minimum area of an available display area, and
measuring a positive output value of a focus detector in respect to the contoured areas, wherein the positive output value is related to an image sharpness of an area of the digital image relating to the contoured area, and
storing the digital image only if the indicator value indicates that the digital image meets the predefined quality criterion.

18. The computer program according to claim 16, wherein said program instructions being executable by one or more computing devices to cause said one or more computing devices to
resetting color information of the digital said image outside the predefined convex frame, and/or
resetting color information of areas of the digital image outside the related boundary contour.

* * * * *